Figure 1:
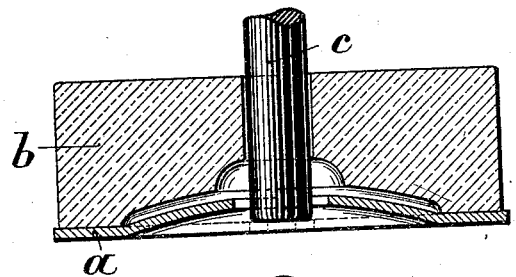
Figure 1:
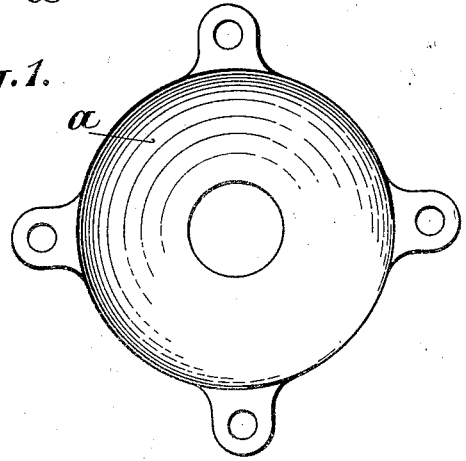

Nov. 16, 1926.

T. L. CARBONE

ELECTRIC ARC LAMP

Filed July 26, 1921

1,607,433

INVENTOR
Tito L. Carbone
BY ATTORNEYS
Lotka, Kehlenbeck & Mathé

Patented Nov. 16, 1926.

1,607,433

UNITED STATES PATENT OFFICE.

TITO LIVIO CARBONE, OF BERLIN, GERMANY.

ELECTRIC-ARC LAMP.

Application filed July 26, 1921, Serial No. 487,748, and in Germany January 29, 1914.

(GRANTED UNDER THE PROVISIONS OF THE ACT OF MARCH 3, 1921, 41 STAT. L., 1313.)

The present invention has for its object to provide in arc lamps for storing in close proximity to the voltaic arc the heat emanating from the latter and to make use of such heat for the purpose of increasing the illuminating power of the gases of said voltaic arc and of attaining a perfect consumption.

According to the present invention this is attained by a special construction of the economizer, said economizer usually consisting of poorly heat-conducting material, is provided with a metal shield for instance of copper, which causes a uniform distribution of the heat of the voltaic arc over the surface of such metal shield, while the cover of poorly heat conducting material serves as a heat accumulator, in such a manner that the copper plate will always retain a constant temperature. If the copper plate and the covering are properly dimensioned, the ends of the carbon rods will always remain in a zone of uniform temperature and no more salts are molten and vaporized, than can just be consumed by the voltaic arc. By this a maximum yield of light as well as a uniform consumption of the terminals of the carbon rods is obtained.

It is of no consequence whether as upper electrode one of metal or carbon is employed and by this new arrangement it has become possible to burn in such lamps carbons containing a considerably higher percentage of luminous additions—about 80 per cent—than has been possible in practice up to the present, since through the temperature in the arc the illuminating substances are brought to full development of their efficiency and the yield of light in the lamp is favorably influenced.

According to the present invention there is provided in close proximity to the burning end of the electrode but out of contact therewith a metal plate, which in connection with a covering of poorly heat-conducting material admits of a uniform accumulation and utilization of the heat in proximity to the voltaic arc.

In the drawings two forms of execution of the invention are shown, partly in section.

In Fig. 1 $a$ represents the suitably shaped copper plate and $b$ the superposed covering of poorly heat-conducting material, in the centre of which the end of the electrode $c$ is arranged, said electrode being out of contact with the plate $a$ and with the covering $b$.

Figure 2:
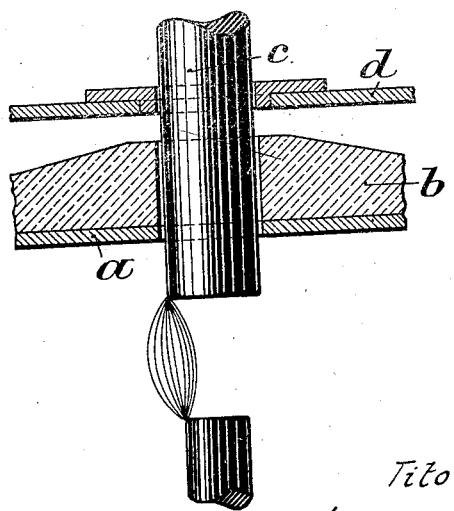

Fig. 2 illustrates a construction especially suitable for use in conjunction with carbons, which possess a particularly high percentage of illuminating salts.

The use of such carbons with high contents of illuminating salts admits of a very considerable yield of light in the lamp, if one succeeds in vaporizing the illuminating substances only immediately at the end of the carbon, and in preventing the destruction of the light producing qualities of such salts previous to their entering the voltaic arc.

The metal shield of the economizer arched towards the inside, as shown in Fig. 1, possesses the disadvantage, that the heat of the voltaic arc is concentrated too much at the exit point of the carbon from the economizer, and that on account of the heat accumulated the illuminating salts of the carbon are caused to evaporate previous to their entering the voltaic arc, or are injured as regards their illuminating effect. This takes place with carbons having a normal content of salt (about 30 per cent) as well as particularly with such carbons, which contain a considerably higher percentage (namely up to about 80 per cent) of such illuminating salts.

As has been ascertained by trials the accumulation of the heat of the voltaic arc at the exit end of the upper carbon rod is prevented, if the metal lining or shield of the economizer towards the voltaic arc is given an approximately flat form. In this case the rising heat is effectively and uniformly reflected downwards so that the downwardly projecting portion of the carbon rod situated above the crater is not heated so strongly and the illuminating salts contained in said rod will retain their full power of efficiency until they enter the voltaic arc. Through the uniform strong reflection of the heat radiating from the voltaic arc a particularly high temperature is attained in the space of the said arc, which temperature is of great importance for the development of light of the illuminating salts. Thus in consequence of the high contents of metallic salts of the carbon rods, a specific watt consumption of one tenth watt per candle may be obtained.

Fig. 2 illustrates this kind of construction of the economizer. At the burning end of the upper carbon rod $c$ at some distance from the lamp plate proper $d$ is provided the economizer $b$ made from fire-clay or any other suitable poorly heat-conducting material, which economizer on the side toward the voltaic arc has a metal lining $a$ of approximately flat form. By this means the accumulation of the heat at the exit point of the carbon, radiating from the voltaic arc and in consequence a corrosion of the carbon at that point is prevented, so that the illuminating salts contained in the carbon rods maintain their full power of efficiency until they enter the voltaic arc, insuring an exceedingly favorable specific watt consumption per candle.

In Fig. 2 as well as in Fig. 1, both the poorly heat-conducting body $b$ and the metal lining $a$ extend close to the electrode $c$, without however touching it. This not only prevents such injury to the carbon as might result from its contact with the said parts $a$ and $b$ of the economizer, but also provides a restricted gas-passage along the carbon and through the economizer.

I claim:

1. In electric arc lamps the combination with the burning end of the upper electrode consisting of metal or carbon of an economizer of metal and a superposed covering body of poorly heat-conducting material, both extending close to the electrode, without touching the same.

2. In electric arc lamps the combination with the burning end of the upper electrode consisting of metal or carbon of an economizer of metal and a superposed covering body of poorly heat-conducting material, both extending close to the electrode, without touching the same, the said metal part of the economizer constituting a shield or lining, approximately flat throughout that surface which faces towards the voltaic arc, for preventing an accumulation of the heat of the voltaic arc at the exit point of the carbon rod from the economizer, and for effecting the vaporization of the metal salts, contained in the carbon rods of particularly high percentage of salt, only immediately at the burning end of the carbon.

3. In connection with an arc lamp electrode, an economizer through which said electrode extends without being in contact therewith, said economizer comprising a metal plate out of contact with the electrode and a body of poorly heat-conducting material likewise out of contact with the electrode but in contact with that face of said plate which is farthest away from the flame end of the electrode.

4. In connection with an arc lamp electrode, an economizer through which said electrode projects, said economizer comprising a body of poorly heat-conducting material out of contact with said electrode and a metal plate likewise out of contact with the electrode but in contact with that face of said body which is nearest to the flame end of the electrode, said metal plate being interposed between such flame end and said body, and having, toward said flame end, a face which is approximately flat from the outer edge of said plate to its central portion.

5. In connection with an arc lamp electrode, an economizer through which said electrode projects, said economizer comprising a body of poorly heat-conducting material and a metal plate interposed between said body and the flame end of the electrode, said plate being in contact with said body, and having, toward said flame end, a face which is approximately flat from the outer edge of said plate to its central portion.

6. In connection with an arc lamp electrode, an economizer through which said electrode projects, said economizer comprising a body of poorly heat-conducting material and a flat metal plate interposed between said body and the flame end of the electrode, said plate being in contact with said body.

In testimony whereof I have affixed my signature.

TITO LIVIO CARBONE.